Reissued Jan. 12, 1954 Re. 23,767

UNITED STATES PATENT OFFICE 23,767

HYDROXY-AROMATIC ALKYLENE DI-IMINO DI-ACETIC ACIDS AND SALTS

Frederick C. Bersworth, Verona, N. J.

No Drawing. Original No. 2,624,760, dated January 6, 1953, Serial No. 193,542, November 1, 1950. Application for reissue August 17, 1953, Serial No. 374,837

6 Claims. (Cl. 260—519)

Matter enclosed in heavy brackets [ ] appears in the original patent but forms no part of this reissue specification; matter printed in italics indicates the additions made by reissue.

This invention relates to chelating compounds for metal ions in aqueous solutions and has for its object the provision of a metal ion chelating compound consisting of a hydroxy-aromatic alkylene diamine diacetic acid or alkali metal, ammonium or amine salt of said acid.

Another object is to provide a bactericidally active alkylene diamine diacetic acid compound which is also active as a metal ion chelating agent in aqueous solutions.

Still another object is to provide water soluble phenolic alkylene diamine diacetic acid compounds which are bactericidally active as well as reactive as metal ion chelating compounds.

Other objects will be apparent as the invention is more fully hereinafter disclosed.

In accordance with these objects I have discovered that where one of the amino hydrogens in each of the amino nitrogen groups of an aliphatic alkylene diamine are displaced by a *substituted* phenyl group and the remaining amino hydrogens are displaced by acetic acid groups, the resultant [di-phenyl alkylene diamine] *disubstituted phenyl* diacetic [acid is] *acids are* water soluble and in aqueous solution are good metal ion chelating agents.

Compounds of the type of the present invention fall generally under the structural formula:

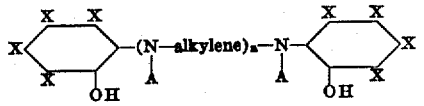

wherein X is selected from the group consisting of hydrogen, alkyl, alkoxyl, hydroxyl and halogen, at least one X being a halogen atom; n is a positive integer selected from the group consisting of 1 to 5; [A represents acetic acid or a homologue acid] *A is from the group consisting of —CH₂COOH, —CH₂CH₂COOH, and the alkali metal, ammonium and amine salts thereof*; and wherein alkylene represents ethylene, propylene or trimethylene.

I have found that the phenolic groups having OH groups in the ortho position of the chelating compounds described above form chelates of very great stability with the transition metals—much greater, for example, than do the analogous compounds with the hydroxyl groups in the meta or para position. Therefore, the ortho hydroxy phenolic groups must take part in the combination of the reagent with the metal. It is well known that some metals such as copper, combine with four complexing groups. The copper chelate of these reagents may have either of the following two structures:

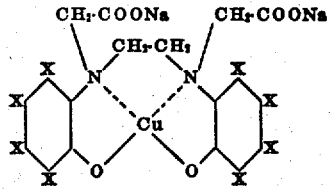

or

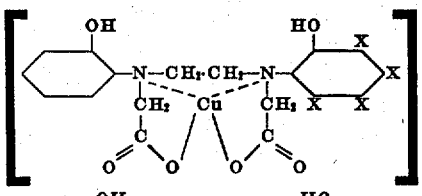

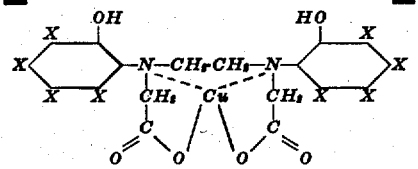

It is impossible from present data to decide between these two possibilities.

However, with certain metals, such as nickel, cobalt and iron, it is known that six complexing groups are quite common. Therefore, it is believed that the greater stability of these phenolic chelates is due to the participation of the phenolic group in chelation with the metal normally to give metal chelates with structures such as:

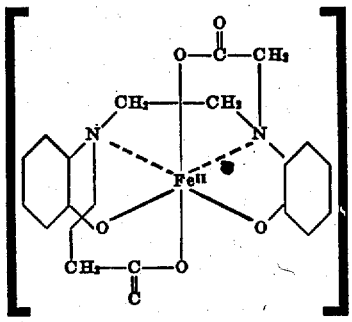

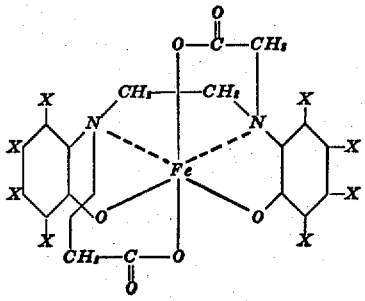

In other words, two carboxyl groups, two phenolic groups and the two amino groups provide the six complexing groups for the metal ion.

Although I have shown examples of compounds with the phenolic hydroxy group in ortho position for purposes of showing the peculiar chelation effect, I may use any hydroxy aromatic compounds without limitation as to the location of the hydroxyl group and/or other substituents.

While the alkali metal salts are quite soluble in water, the chelates are much less soluble in neutral solutions and the compounds may, therefore, be used to precipitate such metal ions in the form of the chelate. However, in alkaline solutions the chelates show an unexpected solubility and which is thought to be due to secondary salt formation either as hydrates or phenolates or both.

The acids themselves as well as the amine salts are quite soluble in organic solvents and oils and so are the chelates. These compounds are, therefore, very useful when it is desired to add metal atoms in non-ionic form to oil, grease or waxes.

The compounds of this invention may also be solubilized by means of sulfonation or sulfoalkylation by reacting the acids of these compounds with sulfuric acid or other sulfonating agents.

In compounds of this type, the simplest compounds to prepare and describe, by way of example but not by way of limitation, are those derived from ethylene diamine diacetic acid. There are several alternative ways to prepare these compounds, one of which is as follows:

Example I

Two moles of o-nitrosophenol are dissolved in alcohol and treated with an excess amount of cupric or nickelous hydroxide until the nitrosophenol has been completely converted into a copper or nickel complex generally considered to have the following structure:

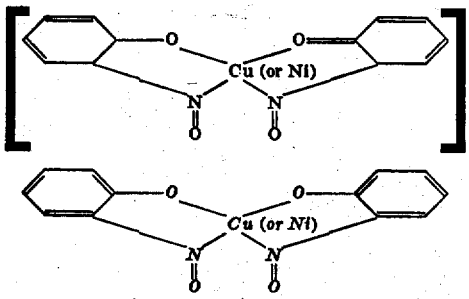

After filtering off the excess metal hydroxide, the alcoholic solution of this complex is added slowly to a 50% aqueous-alcohol solution containing one mole of ethylene diamine while cooling the solution to maintain a reaction temperature of about 85° C.

The resulting [di(o-nitrosophenol) ethylene diamine] *di-(o-nitrosophenyl)-ethylenediamine* metal complex is then decomposed by passing hydrogen sulfide through the solution to precipitate the copper or nickel sulfide and the solution is filtered and the hydrogen sulfide present therein is driven off.

The resulting [di (o-nitrosophenol) ethylene diamine] *di-(o-nitrosophenyl)-ethylenediamine* is catalytically reduced to the [di(amino o-phenyl) ethylene diamine] *di-(o-aminophenyl)-ethylenediamine* and this compound is recovered from solution as the di-hydrochloride.

The di-hydrochloride compound is dissolved in water and is converted to the di-diazonium salt by treatment with $NaNO_2$ and HCl in accordance with known methods and is permitted to hydrolyze in aqueous solution under controlled temperature conditions to the di-(o-hydroxyphenyl) ethylene diamine, according to known reactions.

The aqueous solution of this [di (o-hydroxyphenyl) ethylene diamine] *di-(o-hydroxyphenyl)-ethylenediamine* compound is then carboxylmethylated in accordance with the process described in my Patents Nos. 2,387,735 and 2,407,645 using two molar weights each of NaCN and $CH_2O$ and sufficient caustic soda to give a pH of about 10 and a reaction temperature of 80–85° C.

The resulting reaction solution is then filtered free of insolubles and is neutralized with HCl and the [di (o-hydroxyphenyl) ethylene diamine] *di - (o-hydroxyphenyl)-ethylenediamine* diacetic acid product is recovered therefrom by evaporation to crystallization. This compound has the structural formula:

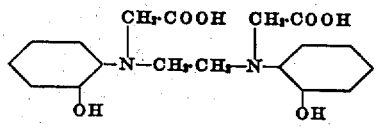

This compound is a very powerful chelating agent for all di-valent heavy metals forming chelates which are soluble in water. The phenolic groups are reactive as a bactericide and fungicide irrespective of the pH of the solution.

On chlorination of the phenolic groups by passing chlorine through an aqueous solution of the di-alkali metal salt of [di (o-hydroxyphenyl) ethylene diamine] *di-(o-hydroxyphenyl) ethylenediamine* diacetic acid, four (4) gram-atoms of chlorine are rapidly absorbed by one mole of the compound yielding on acidification and crystallization chlorinated compounds of the type.

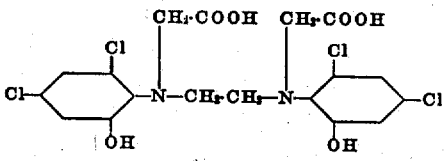

Treatment of the aqueous solution with iodine in place of chlorine results in a very rapid reaction to compounds having from 2 to 4 iodine atoms in each ring. The bromo derivatives may be made in the same manner using bromine in place of iodine.

On further chlorination of the dichloro salt, complete substitution of both aromatic rings may be obtained forming compounds wherein each aromatic ring is chlorinated as follows:

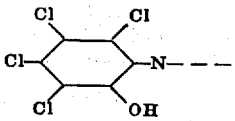

This completely chorinated compound is an excellent bastericide and fungicide and its copper chelate compound is very destructive to lower forms of plant life such as algae and fungi and shows promise as an impregnating agent in wood and cellulosic products to inhibit bactericidal and fungicidal action therein and natural waters to inhibit algae growth therein.

An alternative method of producing the [di (tetra chlorophenyl) ethylene diamine diacetic acid] *di-(tetrachlorophenyl)-ethylenediaminediacetic acid* above described is to treat one mole of the [N,N' di (penta chlorophenyl) ethylene diamine] *N,N' - di - (penta-chlorophenyl)-ethylenediamine* with two moles of freshly precipitated cupric hydroxide and free caustic soda in aqueous solution under pressure at a temperature of 150° to 200° C. for an extended time period, normally from 3 to 5 hours. After cooling to atmospheric temperature the solution is filtered to recover the insoluble deep blue copper amine complex formed in the reaction which has the formula:

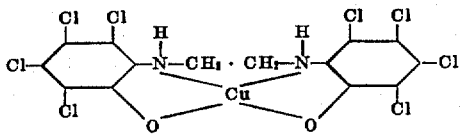

This amino-copper complex is suspended in water and treated with $H_2S$, preferably in the presence of sufficient alcohol to solubilize a part of the complex, until the copper is entirely removed as an insoluble sulfide. The resulting [di-(hydroxy tetra chlorophenyl) ethylene diamine] *di - (hydroxy-tetrachlorophenyl)-ethylenediamine* is put into solution by adding more alcohol to the solution, the copper sulfide is removed therefrom by filtration and the alcohol-water solution removed by evaporation. The solid residues are then dissolved in 80% tertiary butyl alcohol, filtered to remove the last traces of insolubles and the amine is [carboxy-methylated] *carboxymethylated* as hereinabove described, by the addition of two moles each of sodium cyanide and $CH_2O$ to the solution while maintaining an alkaline pH in the reaction solution and a reaction temperature of about the boiling point of the solution.

The gaseous ammonia reaction product is rapidly withdrawn from the reaction solution during the carboxymethylation process to avoid the formation of side reaction products. The alkali metal salt of the diacetic amino acid may be crystallized from the reaction solution by slow evaporation and filtration of crystals as formed. The diacetic amino acid is recovered from the reaction solution by acidification of the solution to a pH of about 3 with HCl, at which it precipitates. The structural formula of the amino acid has been given above.

Example II

As a second example of the present invention, I will describe the process of forming the [di-(o,o'-dimethoxy p-toluidine) ethylene diamine] *di - (o,o' - dimethoxy - p-toluidine)-ethylenediamine* diacetic acid, *which may also be called N,N' - di - (2 - hydroxy - 4-methyl-6-methoxy)-ethylenediaminediacetic acid.* In the production of this compound two (2) moles of o,o'-dimethoxy p-toluidine are dissolved in pyridine solution and are treated under pressure with one mole of ethylene dichloride at a temperature of about 100° to 140° C., to form the [di(o,o'-dimethoxy p - toluidine] *di - (o,o' - dimethoxy-p-toluidine)* ethylene diamine which is isolated from solution as the monohydrate after removal of solvent and pouring the product in water.

On solution of this compound in a water solution of a cupric salt with heating to a refluxing temperature and with vigorous agitation, using an excess of the cupric salt over that theoretically required, there is formed the copper complex having the formula:

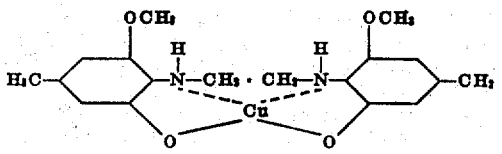

This complex on treatment with $H_2S$ in aqueous solution is converted into the copper-free di-(o-hydroxyphenyl) ethylene diamine which on carboxymethylation as above described is converted into corresponding diacetic acid salt having the formula:

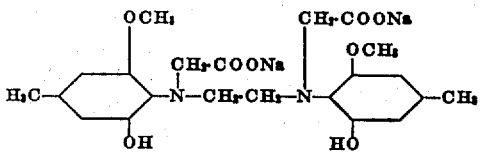

This product is the alkali metal salt. The acid of the compound is precipitated at about pH 3.

On chlorinating the diacetic acid or salt two atoms of chlorine may be introduced into each aromatic ring giving a chlorinated salt which on acidification yields the following diacetic acid amino compound:

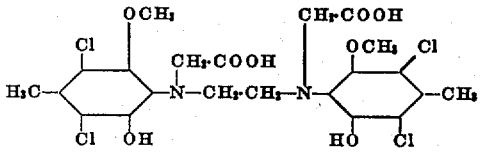

upon neutralization of this acid, the corresponding alkali metal salt is formed.

[This di(o,o'-dimethoxy p-toluidine dichloro) ethylene diamine diacetic acid also is a strong] *This N,N'-di-(2-hydroxy-4-methyl-6-methoxy)-ethylenediaminediacetic acid also is a strong* bactericidal and fungicidal agent and an excellent chelating agent towards most divalent metals.

Example III

Likewise in Example I, propylene diamine may be substituted for ethylene diamine in equivalent molar amounts and in examples given to form, by the same procedure, the analogous propylene diamine diacetic acid compounds.

Example IV

Also trimethylene diamine may be substituted in the examples given in place of ethylene diamine to form the analogous trimethylene diamine diacetic acid compounds. This compound is slightly less effective as a chelating compound than the ethylene and propylene analogues but nevertheless is quite useful in accordance with this invention.

In the above identified compounds it is to be understood that in the aromatic ring it is desirable for germicidal use to have at least one chlorine atom in the ring and that for better germicidal properties it is desirable to have at least one chlorine and *one* hydroxyl group in the aromatic ring. The remaining positions of the ring may be hydrogen or any substituted group for hydrogen which may be a halogen atom.

It is believed apparent to those skilled in the art from the above disclosure and specific examples given that substantially any aliphatic alkylene polyamine may be substituted for ethylene diamine in the described process to form thereby an analogous series of di-phenyl substituted amines which on [carboxy-methylating] *carboxymethylating* to a carboxylic acid after the substitution therein of a hydroxyl group in each benzene ring and/or [halogenate] *halogenating* the ring will yield analogous chemical compounds with similar chemical properties. Accordingly, all compounds are contemplated as within the scope of the invention as may fall within the scope of the following claims.

What is claimed is:

1. The compounds conforming to the following formula:

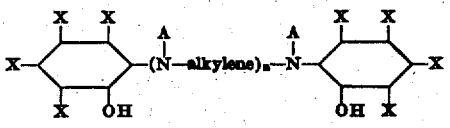

wherein alkylene is one of the group consisting of —$CH_2.CH_2$—; —$CH_2.CH_2CH_2$—, and

—$CH(CH_3CH_2$—

A is one of the group consisting of —$CH_2.COOH$ and —$CH_2.CH_2.COOH$; n is a positive integer selected from the group consisting of 1 to 5; and X is a member of the group consisting of H, halogen, lower alkyl and alkoxyl, *and the alkali metal, ammonium and amine salts thereof.*

2. The compound conforming to the following formula:

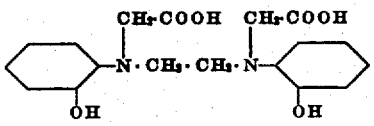

3. The compound conforming to the following formula:

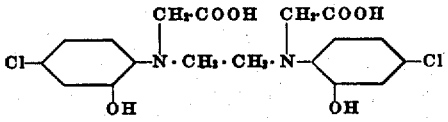

4. The compound conforming to the following formula:

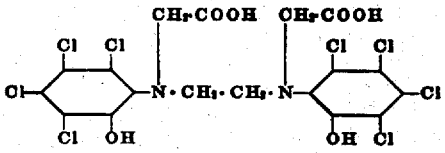

5. The compound conforming to the following formula:

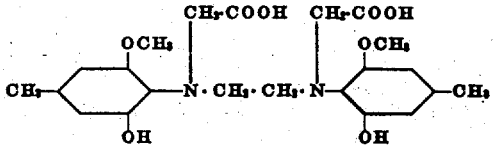

6. The compound conforming to the following formula:

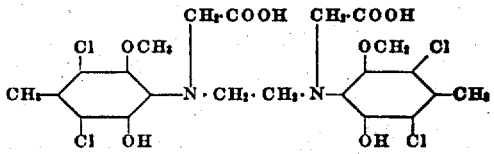

FREDERICK C. BERSWORTH.

References Cited in the file of this patent or the original patent

UNITED STATES PATENTS

| Number | Name | Date |
|---|---|---|
| 868,294 | Schmidlin | Oct. 15, 1907 |
| 2,195,974 | Reppe et al. | Apr. 2, 1940 |
| 2,489,363 | Bersworth | Nov. 29, 1949 |

FOREIGN PATENTS

| Number | Country | Date |
|---|---|---|
| 18,095 | Great Britain | of 1913 |
| 642,244 | Germany | Mar. 6, 1937 |

OTHER REFERENCES

Alphen: Chem. Abs., vol. 38, col 4943 (1944).

Bischoff et al.: Beilstein (Handbuch, 4th ed.), vol. 12, page 547, (1929).